United States Patent
Flores et al.

(10) Patent No.: US 7,032,229 B1
(45) Date of Patent: Apr. 18, 2006

(54) AUTOMATIC TRACKING OF USER PROGRESS IN A SOFTWARE APPLICATION

(75) Inventors: Roger Flores, Redwood City, CA (US); Ben Bostwick, Redwood City, CA (US)

(73) Assignee: PalmSource, Inc., Sunnyvale, CA (US)

( * ) Notice: Subject to any disclaimer, the term of this patent is extended or adjusted under 35 U.S.C. 154(b) by 396 days.

(21) Appl. No.: 09/874,578

(22) Filed: Jun. 4, 2001

(51) Int. Cl.
*G06F 9/00* (2006.01)

(52) U.S. Cl. .................. 719/328; 709/224; 717/128

(58) Field of Classification Search .............. 709/328, 709/322, 317, 318, 314, 312, 224–228; 719/310, 719/328, 330–332, 312–317; 714/39, 38, 714/22; 455/404.2, 405, 406; 700/91; 702/63; 705/22, 10; 710/15–18; 712/216; 713/340; 715/736, 826; 717/120, 127, 128–130, 103, 717/108, 131
See application file for complete search history.

(56) References Cited

U.S. PATENT DOCUMENTS

| | | | | |
|---|---|---|---|---|
| 5,727,202 A | | 3/1998 | Kucala ..................... 395/610 |
| 5,746,656 A | * | 5/1998 | Bezick et al. ............... 463/42 |
| 5,796,952 A | * | 8/1998 | Davis et al. ............... 709/224 |
| 5,862,346 A | * | 1/1999 | Kley et al. ................ 709/245 |
| 5,884,323 A | | 3/1999 | Hawkins et al. ........... 707/201 |
| 5,970,143 A | * | 10/1999 | Schneier et al. .......... 713/181 |
| 5,983,129 A | * | 11/1999 | Cowan et al. ............ 600/544 |
| 6,000,000 A | | 12/1999 | Hawkins et al. .......... 707/201 |
| 6,006,274 A | | 12/1999 | Hawkins et al. .......... 709/248 |
| 6,112,240 A | * | 8/2000 | Pogue et al. .............. 709/224 |
| 6,138,155 A | * | 10/2000 | Davis et al. ............... 709/224 |
| 6,167,358 A | * | 12/2000 | Othmer et al. ............ 702/188 |
| 6,279,038 B1 | * | 8/2001 | Hogan et al. .............. 709/224 |
| 6,308,201 B1 | * | 10/2001 | Pivowar et al. ............ 709/214 |
| 6,353,929 B1 | * | 3/2002 | Houston ...................... 725/20 |
| 6,442,699 B1 | * | 8/2002 | Nakajima ................... 713/320 |
| 6,487,583 B1 | * | 11/2002 | Harvey et al. .............. 709/204 |
| 6,526,524 B1 | * | 2/2003 | Kelley ......................... 714/38 |
| 6,553,037 B1 | * | 4/2003 | Pivowar et al. ............ 370/463 |

(Continued)

OTHER PUBLICATIONS

PalmTech; Watch-Ya! Viewer ver 2.11; Jul. 4, 2000; http://homepage1.nifty.com/abby/PalmTech/Watcha2e/Watch-Ya2.html; 8 pages.
PalmTech; Watch-Ya! Hack ver 2.11, Jul. 4, 2000; http://homepage1.nifty.com/abby/PalmTech/Watcha2e/Watch-Ya2.html; 9 pages.

(Continued)

*Primary Examiner*—John Follansbee
*Assistant Examiner*—Haresh Patel
(74) *Attorney, Agent, or Firm*—Berry & Associates P.C.

(57) ABSTRACT

A method for automatically tracking application and content usage is disclosed. According to an embodiment of the present invention, a method first recites the step of accessing an application interface (API) call with a parameter specifying a first portion of content to be measured. For example, the amount of time for which the portion of content is used is measured. Next the method recites, in response to the accessed call, measuring usage for the first portion of content. Then, the method recites continuing to access API calls specifying additional portions of content to be measured until the program making the calls finishes execution. In this fashion, content usage is tracked. Application developers may determine, from the content usage, where users are getting stuck in a game or what segments of an electronic document are being viewed.

17 Claims, 7 Drawing Sheets

U.S. PATENT DOCUMENTS

| | | | |
|---|---|---|---|
| 6,553,336 B1 * | 4/2003 | Johnson et al. | 702/188 |
| 6,553,404 B1 * | 4/2003 | Stern | 709/203 |
| 6,616,532 B1 * | 9/2003 | Albrecht | 463/29 |
| 6,645,077 B1 * | 11/2003 | Rowe | 463/42 |
| 6,692,354 B1 * | 2/2004 | Tracy et al. | 463/16 |
| 6,704,783 B1 * | 3/2004 | Shibata et al. | 709/224 |
| 2001/0054026 A1 * | 12/2001 | Choate | |
| 2002/0103899 A1 * | 8/2002 | Hogan et al. | 709/224 |
| 2002/0188522 A1 * | 12/2002 | McCall et al. | 705/26 |
| 2003/0046385 A1 * | 3/2003 | Vincent | |

OTHER PUBLICATIONS

PalmTech; Watch-Ya! package ver 2.11, Jul. 4, 2000; http://homepage1.nifty.com/abby/PalmTech/Watcha2e/Watch-Ya2.html; 2 pages.

Benc Software Production; Application Usage0.8.1; Unknown; http://www.benc.hr/appusage. htm: 1 page.

* cited by examiner

FIG. 3A 305

| Monitor | 1 Byte |
|---|---|
| UserID | 8 Bytes |
| User Name | 21 Bytes |
| User email | 41 Bytes |

FIG. 3B 310

| Data Structure Count | 2 Bytes |
|---|---|
| Date | 2 Bytes |
| Data Structure Type Indicator | 2 Bytes |
| Array of Data Structures | n Bytes |

FIG. 3C 315

| Creator Code | 4 Bytes |
|---|---|
| Time Spent | 4 Bytes |
| Count | 2 Bytes |

FIG. 3D 320

| Creator Code | 4 Bytes |
|---|---|
| Time Spent | 4 Bytes |
| Count | 2 Bytes |
| Application Specified Measurement | 2 Bytes |
| Type | 4 bytes |
| Database Name | 32 Bytes |

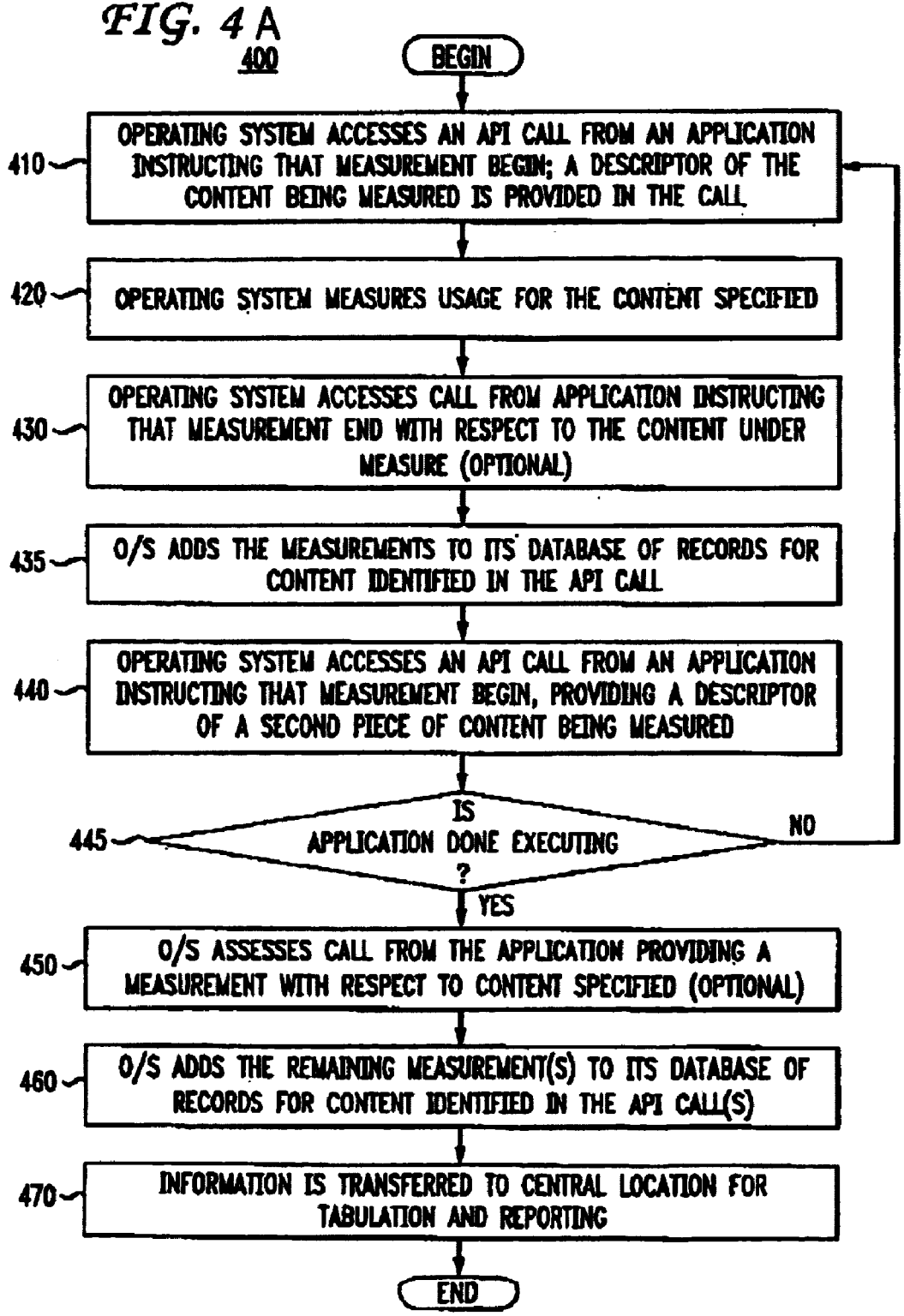

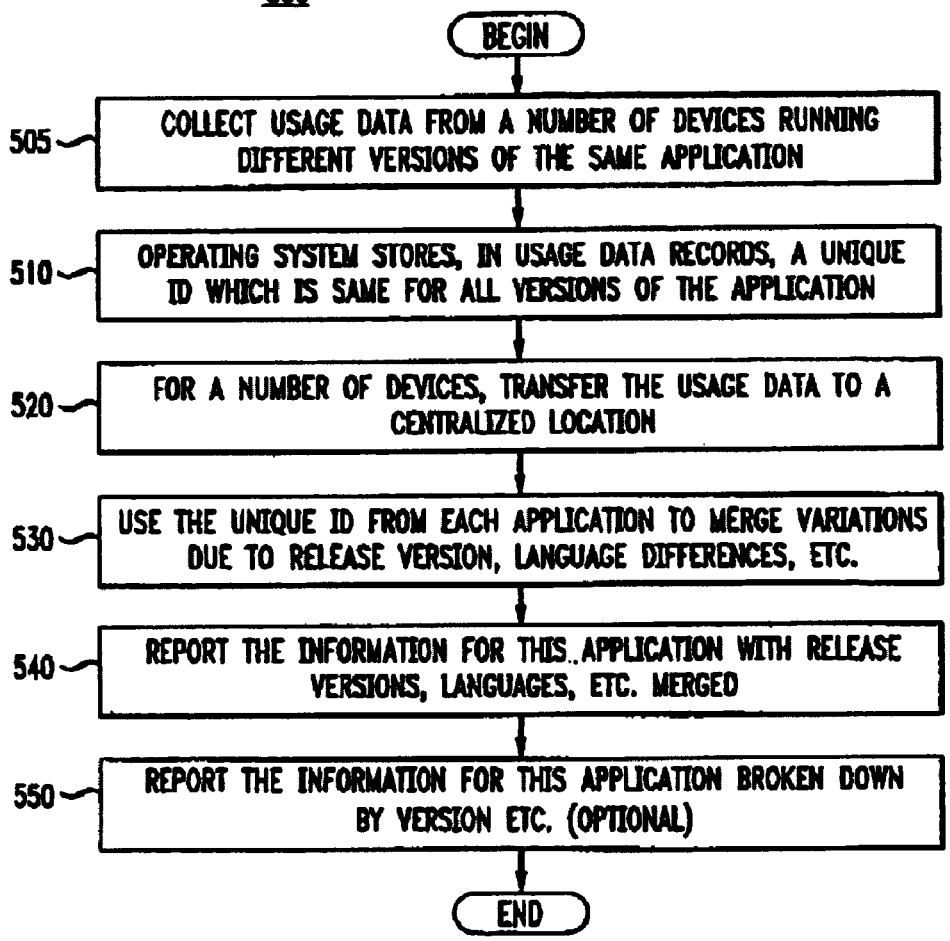

AUTOMATIC TRACKING OF USER PROGRESS IN A SOFTWARE APPLICATION

RELATED U.S. APPLICATION

This Application is related to U.S. patent application entitled, "Automatic Collection and Updating of Application Usage," application Ser. No. 09/874,717, filed on Jun. 4, 2001.

FIELD OF THE INVENTION

The present invention relates to the field of computer application development. Specifically, the present invention relates to a method for automatically tracking computer applications and content associated with the application.

BACKGROUND ART

As the number of programs which are written for electronic devices increases, it is becoming harder to keep track of application usage. While conventional methods exist for reporting usage information related to application software, most fail in more than one regard. Today the tracking methods do not share the information such that other users and developers may see which programs are popular, the methods are not objective, and the methods are not transparent to the user. Furthermore, the methods today do not allow the tracking of content, such as the level of a game to which a user advanced or the chapters in an electronic document which were viewed. Due to these deficiencies, developers and authors may not be able to readily gain useful information to improve their products.

One conventional method of tracking application usage provides software which monitors application usage in terms of duration and battery usage on the device. Unfortunately, this method does not provide for sharing the information and hence is of limited value to developers or other users.

Another conventional method provides for software which monitors application usage in terms of count and time duration and supports exporting the information to a spreadsheet. However, the method is not transparent to the user. Also, developers and other users are generally not aided by the information.

Another conventional method is the UNIX process command (PS) which tracks the duration of execution for every executing application. However, once the application stops executing, the tracking stops. Consequently, there is no cumulative tally of the information, which is necessary for tracking information. Furthermore, this method does not provide for sharing of information with other users or with developers.

A conventional method that shares information tracks the popularity of various content, such as computer games, music, and movies by relying on votes cast by individuals. However, this is not transparent to the user and is not objective. Hence, it is prone to inaccuracies.

There are methods for synchronizing data between two computer systems. For example, U.S. Pat. No. 6,000,000, entitled "Extendible Method and Apparatus For Synchronizing Multiple Files On Two Different Computer Systems" discloses a synchronization process. However, such methods do not share information such that other users and developers may see which programs are popular.

None of these methods provides for a method which gives developers and authors a good idea of how their games or documents are being used. For example, these methods do not provide information as to how far into a game or electronic document a user proceeded before stopping.

SUMMARY OF THE INVENTION

Therefore, it would be advantageous to provide a method which tracks application and content usage. A further need exists for such a method which shares the information between multiple users and provides the information to application developers. A still further need exists for a method which is both objective and transparent to the user. An even further need exists to track how far into a game or electronic document a user proceeded. A need also exists for a method which can track the application and content usage for programs which are essentially the same but are written in different languages or are a different version.

An embodiment of the present invention provides a method for tracking application and content usage. Embodiments allow information to be shared between multiple users, even if the users are running different versions of the same program or if the program interfaces with users in a different language. Embodiments are transparent to the user and provide objective results. Embodiments allow the tracking of content usage, for example, how far into a game or electronic document a user proceeded.

A method for automatically tracking application and content usage is disclosed. According to an embodiment of the present invention, a method first performs the step of accessing an application program interface (API) call with a parameter specifying a first portion of content to be measured. For example, the amount of time for which the portion of content is used is measured. Next, in response to the accessed call, the method measures usage for the first portion of content. Then, the method continues to access API calls specifying additional portions of content to be measured until the program making the calls finishes execution. In this fashion, content usage is tracked. Application developers may determine, from the content usage, where users are getting stuck in a game or what segments of an electronic document are being viewed.

Another embodiment provides for a method which first collects usage data for a software program having a number of versions. The collection takes place on many electronic devices. Next, the method of this embodiment associates a unique identifier with the software program for at least two of the versions. The unique identifier allows the software program to be distinguished from other software programs. Then, the method transfers the usage data to a repository. Thus, the usage information which is collected on the devices is merged.

The present invention provides these advantages and others not specifically mentioned above but described in the sections to follow.

BRIEF DESCRIPTION OF THE DRAWINGS

FIG. 3A, FIG. 3B, FIG. 3C, and FIG. 3D are diagrams of data structures for storing various usage data, according to embodiments of the present invention.

FIG. 4 is a flowchart illustrating steps of a process of tracking application usage content, according to embodiments of the present invention.

DETAILED DESCRIPTION OF THE INVENTION

Figure 1:
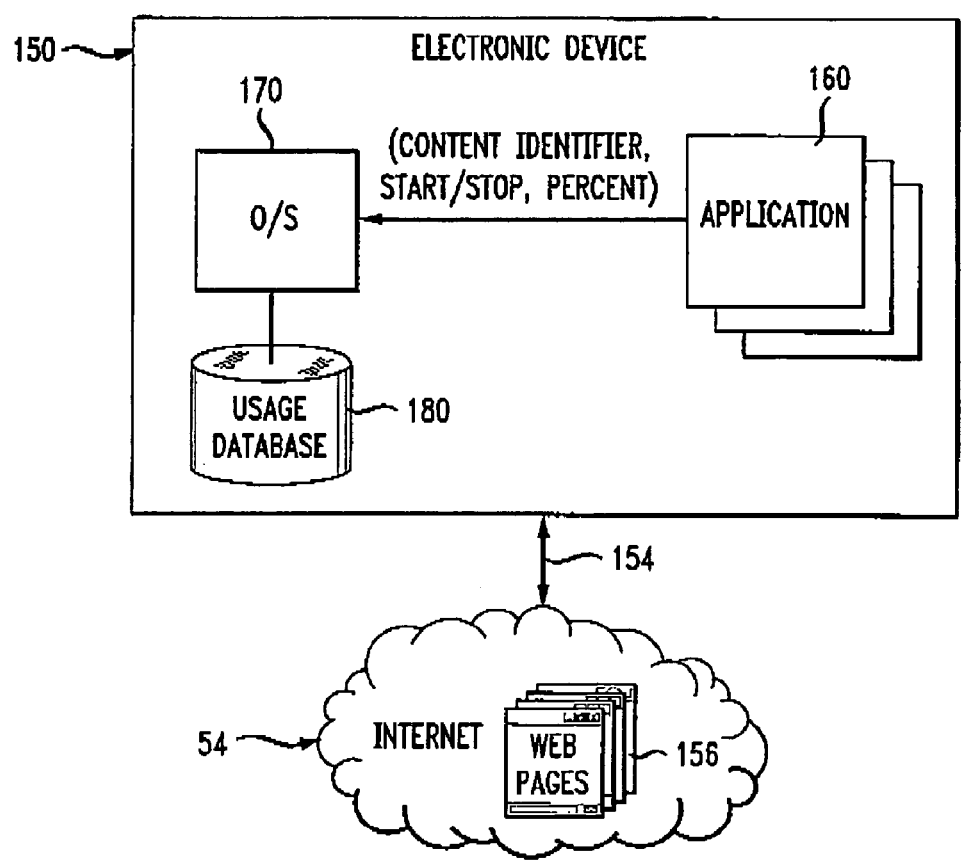
FIG. 1 is a block diagram of software which collects usage data from applications and stores them on an electronic device, according to embodiments of the present invention.

In the following detailed description of the present invention, a method for automatically tracking application and content usage, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory (e.g., processes 400 and 500). These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "indexing" or "processing" or "computing" or "translating" or "calculating" or "determining" or "scrolling" or "displaying" or "recognizing" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Automatic Tracking of Application and Content Usage

The present invention collects and stores, information related to applications that execute on, for example, a personal digital assistant (PDA). However, the present invention is not limited to PDAs. Embodiments track content usage for example, the levels in a game, the number of chapters or segments of an electronic document, or web pages. The usage data provide information as to whether a given portion of content was accessed and for how long. Embodiments of the present invention also track how much of a portion of content (e.g. a level in a game) was used. For example, the percent of a game level that was traversed is tracked. The information is transferred to a server repository, where the data is store, tabulated, and displayed. User and developers may visit a web site to see the results. In one embodiment, the usage data for a large number of electronic devices, such as PDAs are tracked. When the device is synchronized to a host computer, the usage data are transferred. At a suitable time, the host computer transfers the usage data to the server. A system for collecting usage data from an electronic device, transferring to a host computer, transferring to a server, and displaying the results is described in U.S. patent application Ser. No. 09/874,717, concurrently filed herewith entitled, "Automatic Collection and Updating of Application Usage", by Flores, and assigned to the assignee of the present invention, which is hereby incorporated by reference in its entirety.

FIG. 1 illustrates an electronic device 150, which has a number of application programs 160. Additionally, the device 150 has a connection 154 to an external source, such as, for example, the Internet 54. Embodiments track content usage, such as web pages 156 visited. The tracking may be by time, total visits, or any suitable measure which is an indicator of user focus or attention. The application 160 passes to the operating system 170 via an application program interface (API) a parameter identifying a portion of content to be measured (e.g., content identifier). Additionally, the API may have a parameter (e.g., start/stop) to indicate to the operating system 170 (or other measuring software, system extension, etc.) that measuring is to begin or end. Furthermore, the API may have a parameter (e.g., percent) for the percent of the content identified which was used. The operating system 170 stores the usage data in a usage database 180 on the device 150. The storing may take place in response to either an API call or when the application 160 exits.

Figure 2:
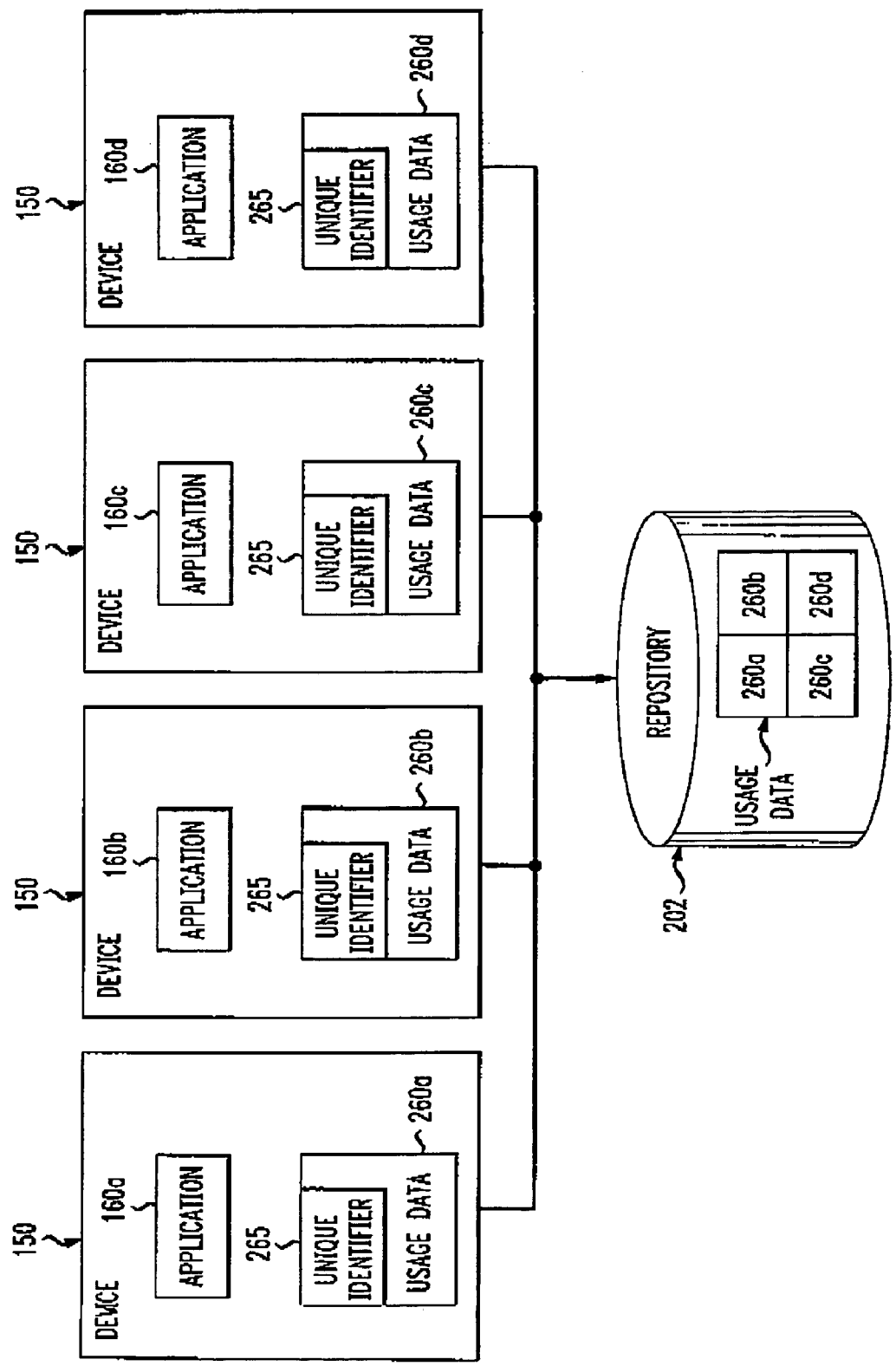
FIG. 2 is a block diagram showing numerous devices running different versions of an application with the data being transferred and merged, according to embodiments of the present invention.

Even though an application 160 may have multiple versions, it is useful to merge the usage data from the various versions. Throughout this application when referring to versions of an application, software program, or the like it is meant the various release versions of the application, the various versions which exist to interface with the user in a different languages, the different versions written in different programming languages, or other versions of what is essentially the same application or software program. FIG. 2 illustrates a block diagram in which multiple devices 150 are running different versions of the same program 160a–160d (e.g., different release versions, programming languages, user interface languages, etc.). Usage data 260a–260d is collected and assigned a unique identifier 265. The usage data 260 is transferred to a repository 202, such that the usage data 260 may be tabulated and reported. The usage data 260 may be transferred to the server repository 202 in any suitable fashion. In this fashion, usage data 260 from all versions of an application 160 can be merged to determine a net usage pattern. Alternatively, developers can track usage of their applications 160 by release version (or language, etc.) to find out which versions are the most popular.

Embodiments of the present invention store records of the collected usage data 260 on the electronic device 150. A usage database 180 exists on the device 150, which contains records relating to each application 160, as well as records relating to content which is tracked. FIG. 3B illustrates an exemplary usage record header structure 310, which comprises fields for the data structure count, date, and data structure type indicator. These are followed by the array of usage data structures. There are two types of usage records in the array. A first is for storing usage data of applications 160. A second is for storing data for non-application content, such as, for example, web pages visited, game levels, documents (e.g., electronic books), etc.

FIG. 3C illustrates an exemplary data structure for a usage application data record 315. The application data record 315 may be created when the application program 160 is first installed, for example. At this time only the creator code is filled. The creator code is a 32 bit code which is unique for each application program 160. In one embodiment, this is based on a unique identifier which is assigned to each application program, as is understood by those of ordinary skill in the art. Other lengths may be used for the creator code. The creator code filed may also contain information such as, for example, a language or version number. After an application program 160 finishes execution, the entries for time spent and count are updated. In this fashion, the time spent using an application 160 and the number of times the application 160 is used is tracked.

FIG. 3D illustrates an exemplary usage content data structure 320, which is updated whenever an application 160 finishes executing, as well as whenever an API call is made requesting an update. For example, an API call may be made by applications 160 to direct that content specified in the API call should be measured. The usage content data structure 320 comprises a creator code, time spent, and count. Additionally, the structure 320 comprises a field for the type of content (e.g., web page, document, game, etc.), an application specified measurement regarding the content, and a database name. The application specified measurement may be a percent, an encoded number, etc. The percent may indicate how much of the content was used, viewed, etc. by the user. The encoded number may specify a chapter and page (e.g., 12.01) or a sequence of text (e.g., chapter 1, page 1, paragraph 2). This information may be encoded in any suitable format. The usage records 320 may be deleted after their information is transferred to the server repository 202. In one embodiment, a separate total usage record is kept on the device 150 so that the device user may see what the cumulative usage history is on this device 150.

FIG. 3A illustrates an exemplary application information block 305 comprising fields for monitor (instructs whether to keep usage statistic or not), user identification, user name, and user e-mail. Preferably, collecting usage data 260 is done at the option of the user of the electronic device 150, although this is not required. In order to activate collecting usage data 260, the device user may sign up at a web site. Alternatively, the user may sign up through an application 160 on the electronic device 150.

Each application 160 will have one usage application data record 315. However, a usage content data structure 320 does not necessarily correlate to a particular application 160. For example, any number of applications 160 could cause a given usage content data structure 320 to be updated. For example, more than one application 160 could cause a web page 156 to be visited. In these cases, the creator code may not be relevant or may be filled with another code to identify the web page uniquely, as desired.

Figure 6:
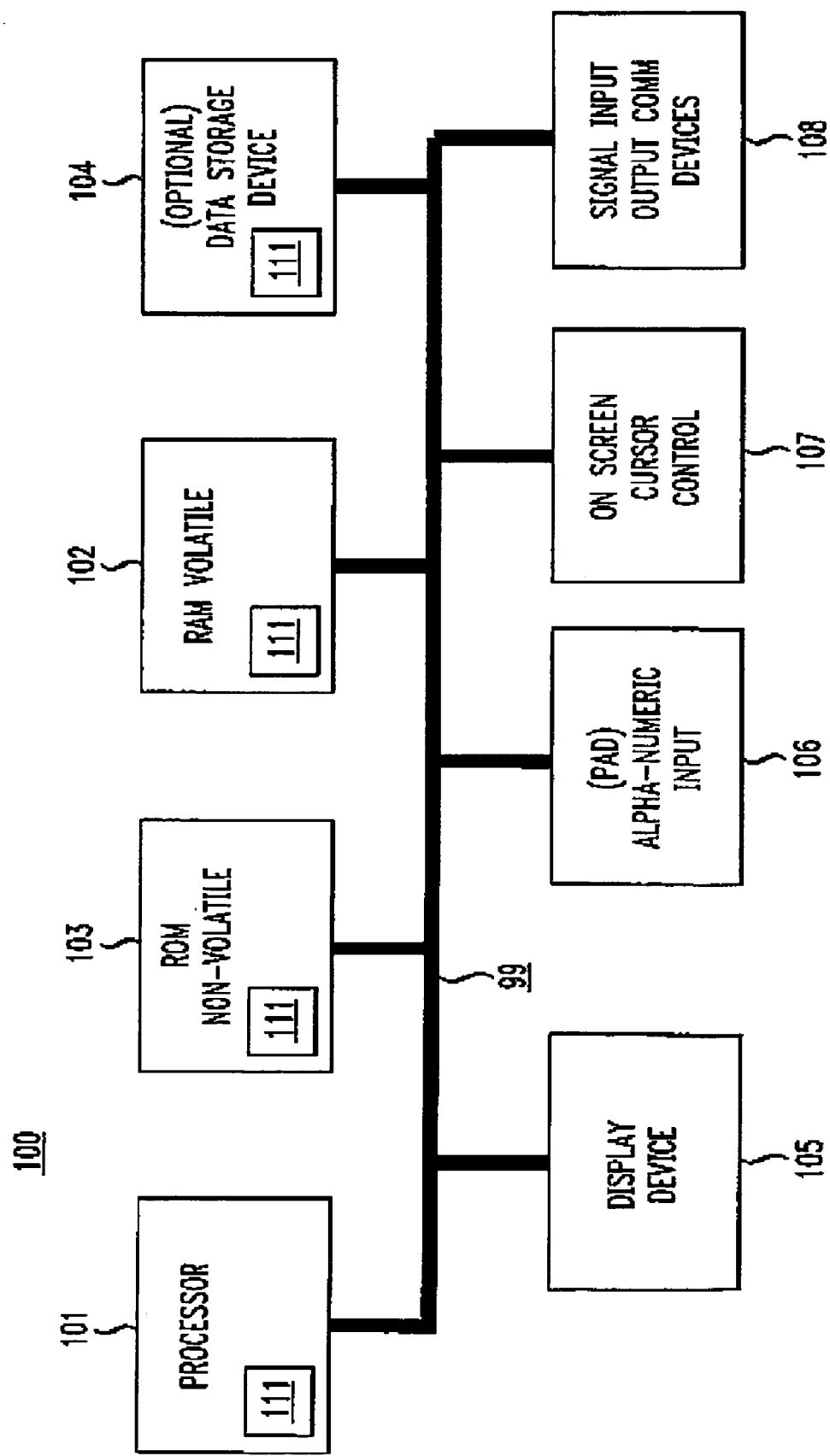
FIG. 6 is a schematic of a computer system, which may be used to implement embodiments of the present invention.

An embodiment provides for a method of tracking content usage. The steps of the process 400 of FIG. 4 may be executed on a general purpose computer 100 such as shown in FIG. 6. The steps may be executed by an operating system 170 of an electronic device 150, although this not required. In step 410, the operating system 170 accesses a call from an application 160 executing on the electronic device 150. The application 160 may make the call via an application program interface (API) in order to have selected content measured in some fashion. Thus, a parameter (e.g., content identifier) is passed in the API which specifies the content to be measured. Additionally, a parameter may be passed instructing that measurement start for the content identified.

In response to the call, the operating system 170 begins a measurement, in step 420. The measurement is designed to gain insight into user focus. Hence, the measurement may be time as measured in clock cycles, CPU cycles, or any suitable method to measure time. In one embodiment, time is counted when the system is powered up. In one embodiment, time is measured as units, which may be some fraction of a second. For example, each $\frac{1}{100}$ of a second is one unit. Any suitable unit may be used. However, the present invention is not limited to measuring usage in time. For example, some embodiments measure usage in terms of percent of content used, number of accesses, how far into a game or document that a user advanced, etc.

In step 430, a call is accessed by the operating system 170 indicating that measurement is to stop. The application program 160 may pass in a stop parameter to accomplish this. Alternatively, stopping measurement of the first content may be implied by starting measurement of the next content.

In step 435, the usage data 260 is stored. The operating system 170 links the measurement with the portion of content identified in the API call. However, when making the actual measurement, the operating system 170 does not directly measure the content. Rather the operating system 170 simply measures according to instructions from the application program 160. The content identifier provided in the API call is used to label what was measured.

In step 440, a call is accessed by the operating system 170 from the application 160 instructing that a measurement is to be made for the next content, which is identified in the call. The application program 160 determines what content to measure, when to start and stop, etc.

The operating system 170 continues to process calls from the application program 160 to measure usage for various content, as identified by a content identifier in the calls, in step 445.

In step 450, the operating system 170 accesses a call from the application 160 specifying a content identifier and an application specified measurement regarding that content (e.g., a percent of the identified content that was used; an encoded number which represents, for example, a chapter and page, etc.). Simply reporting that a user progressed to a given level in a game or that a user spent a given amount of time on a specified level may not be enough information for a developer. The developer may wish to more precisely locate where users are getting stuck. Thus, the application program 160 may specify a measure of how far into the content the user progressed.

In step 460, the operating system 170 recognizes that the application program 160 has finished executing. Thus, it adds remaining usage data 260 to its database 180 of records.

In step 470, the information in the database 180 is transferred to a repository 202 (e.g., web site) where it is stored, tabulated, reported, etc.) In this fashion, the usage data 260 may be analyzed by software developers, as well as users. In one embodiment, a synchronization process is performed to transfer the data from the electronic device 150 to the host computer. Details of one possible implementation of a synchronization process, along with a description of software, are described in U.S. Pat. No. 6,000,000, entitled "Extendible Method and Apparatus For Synchronizing Multiple Files On Two Different Computer Systems", issued Dec. 7, 1999, which is hereby incorporated by reference. Among other issues, the data may help developers see which versions of software that are most popular and thus assure that these applications 160 will be compatible with future versions of the electronic device 150.

Figure 5:
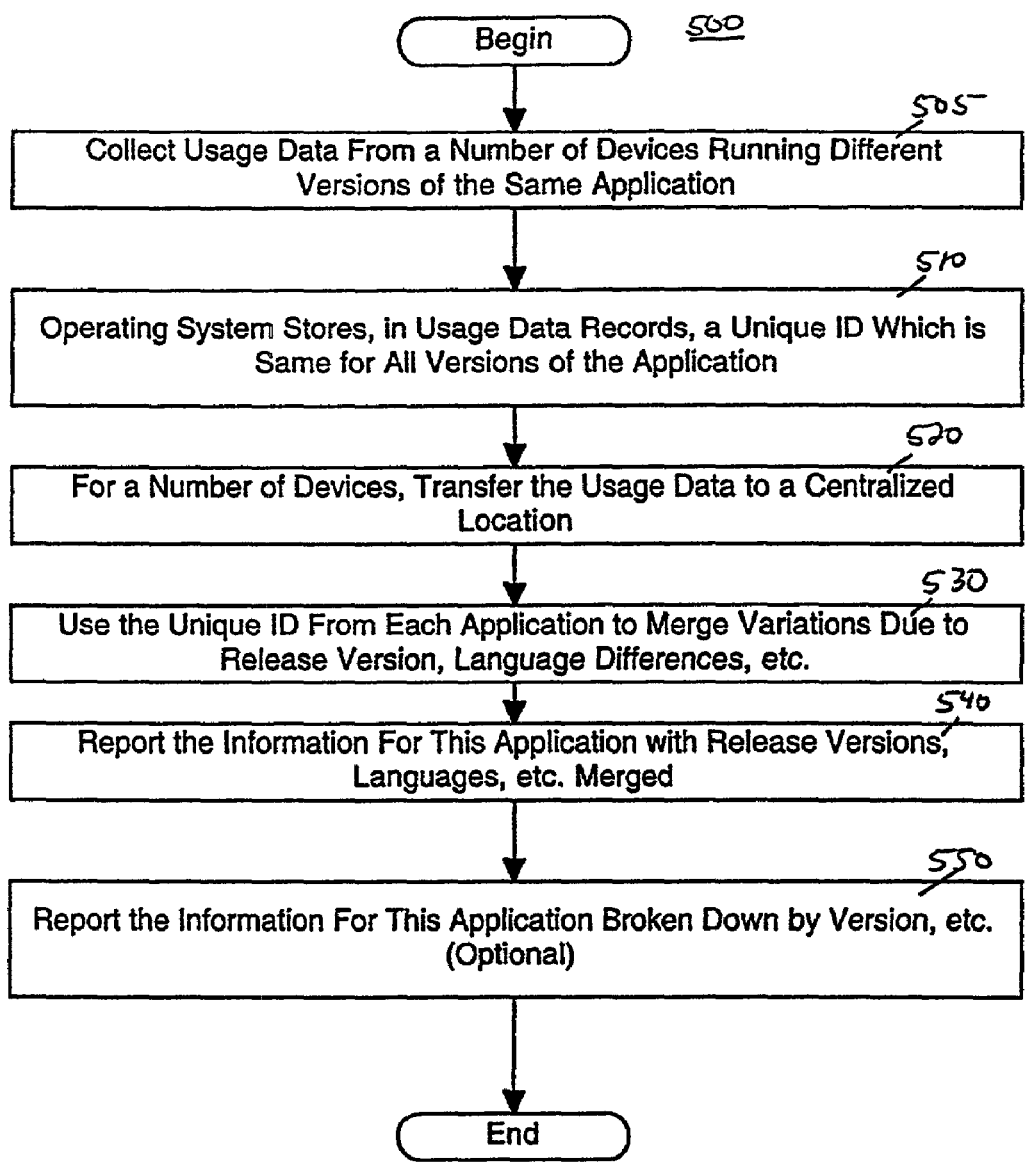
FIG. 5 is a flowchart illustrating steps of a process of tracking application usage content, according to embodiments of the present invention.

Another embodiment of the present invention provides for a method of tracking application and content usage by a unique identifier to merge variations due to release version, localization, etc. A variation of this embodiment is to report the information by version, etc. In this fashion, a developer may see which versions of an application 160 are most popular. The process 500 in FIG. 5, illustrates steps of this embodiment. In step 505, usage data 260 is collected. The information is collected on a number of devices 150, which are executing the various versions of the application program 160.

In step 510, the operating system 170 stores a unique identifier in the usage application data structure 315 or the usage content data structure 320 with the rest of the usage data 260 for an application 160. This may occur when an application 160 exits or after measurement of a portion of content is stopped. The unique identifier 265 is the same for all versions of the application 160 for which it is desired that the data be merged. For example, the various versions of the application 160 may comprise various release versions, programming languages, user interface languages, etc. However, it is not required that all versions be given the same unique identifier 265. The unique identifier 265 may be a creator code, which is a 32 bit code which is unique for each application program 160, as is well understood by those of ordinary skill in the art. Content usage may be merged, as well. For example, a single creator code may be used for all usage content data structures 320 for all versions of a game. Thus, the game level information may be merged for each version of the game, if desired.

In step 520, the usage data 260 from the various devices 150 is transferred to a repository 202. In step 530, the usage data from various versions are merged by using the unique identifier 265. Thus, variations due to release versions, language, etc. are removed. As data collected from some applications 160 may be limited, merging data may considerably improve the accuracy of the statistics. In step 540, the information is reported.

In optional step 550, the information is broken down by release version, language, etc., and reported in this fashion. Thus, a developer may see which versions of an application 160 are most used or may determine the effect a change to a game has on its level of difficulty, etc.

FIG. 6 illustrates circuitry of computer system 100, which may form a platform for embodiments of the present invention. Computer system 100 includes an address/data bus 99 for communicating information, a central processor 101 coupled with the bus 99 for processing information and instructions 111, a volatile memory 102 (e.g., random access memory RAM) coupled with the bus 99 for storing information and instructions 111 for the central processor 101 and a non-volatile memory 103 (e.g., read only memory ROM) coupled with the bus 99 for storing static information and instructions 111 for the processor 101. Computer system 100 also includes an optional data storage device 104 (e.g., a magnetic or optical disk and disk drive) coupled with the bus 99 for storing information and instructions 111.

With reference still to FIG. 6, system 100 of the present invention also includes an optional alphanumeric input device 106 including alphanumeric and function keys is coupled to bus 99 for communicating information and command selections to central processor unit 101. System 100 also optionally includes a cursor control device 107 coupled to bus 99 for communicating user input information and command selections to central processor unit 101. System 100 of the present embodiment also includes an optional display device 105 coupled to bus 99 for displaying information. A signal input/output communication device 108 coupled to bus 99 provides communication with external devices.

The preferred embodiment of the present invention, a method for automatically tracking application and content usage, is thus described. While the present invention has been described in particular embodiments, it should be appreciated that the present invention should not be construed as limited by such embodiments, but rather construed according to the below claims.

What is claimed is:

1. A method of tracking user progress in a software application, said method comprising:
   a monitor program accessing a first application program interface (API) call from said software application; wherein, said first API call providing a first content descriptor and a request to start measuring an amount of usage of the software application, and said user progress identifies the amount of usage of the software application by said user;
   said monitor program incrementing a usage measure until receiving a second API call from said software application requesting to stop said measuring;
   storing said usage measure and said first content descriptor in a computer readable medium, wherein said user progress is measured by said monitor program as directed by said software application;
   said monitor program accessing a third API call from said software application, said third API call providing a second content descriptor and a provided measure of said user progress; and
   storing said provided measure of said user progress and said second content descriptor in the computer readable medium, wherein said software application provides said provided measure of said user progress.

2. The method as recited in claim 1, wherein said first and second content descriptors identify information selected from a group consisting of levels of a game, segments in an electronic document, and web pages.

3. The method as recited in claim 1, wherein said provided measure of user progress describes percent usage of content identified by said second content descriptor.

4. The method as recited in claim 1, further comprising:
   associating a unique identifier with said software application that identifies a program version.

5. A method of tracking user interaction with portions of a software application, said method comprising:
   a monitor program accessing a first application program interface (API) from said software application; wherein said first API call providing a first content descriptor identifying a first portion of the software application and a request to start measuring an amount of usage of said first portion, said tracking tracks progress in the software application by said user, and said progress identifies an amount of usage of the software application by said user;

said monitor program determining a first usage value for said first portion of content in response to said first API call;

said monitor program accessing a second API call from said software application comprising a second descriptor identifying a second portion of the software application and a request from the software application to start measuring an amount of usage of said second portion;

said monitor program determining a second usage value for said second portion of content in response to said second API call; and storing, in a computer readable medium said first usage value and said second usage value associated respectively with said first descriptor and said second descriptor, wherein said first usage value and said second usage value define said user interaction with said first portion and said second portions of said software application.

6. The method as described in claim 5, further comprising:

accessing a third program call comprising a third descriptor identifying a third portion of the calling program and a third usage value for said third portion; and storing said third usage value corresponding to said third descriptor.

7. The method as described in claim 6, wherein said third usage value is percent utilization of said third portion.

8. The method as described in claim 6, wherein said third descriptor identifies a level of a game.

9. The method as described in claim 6, wherein said third descriptor identifies a segment in an electronic document.

10. The method as described in claim 5, wherein said first and second descriptors identify levels of a game.

11. The method as described in claim 5, wherein said first and second descriptors identify segments in an electronic document.

12. The method as described in claim 5, further comprising:

transferring said first and second usage values to a repository; and tabulating and reporting said first and second usage values.

13. The method as described in claim 5, further comprising:

associating a unique identifier with said software application that identifies a program version.

14. A method of tracking user progress in a software application executing on an electronic device, said method comprising:

an operating system running on said electronic device accessing a first application program interface (API) call from said software application; wherein, said first API call providing a first content descriptor and a request to start measuring an amount of usage of the software application, and said user progress identifies the amount of usage of the software application by said user;

said first API call contains said request to measure said user progress;

said operating system incrementing a usage measure until receiving a second API call from said software application requesting to stop said measuring;

said operating system storing, in a computer readable medium on said electronic device, said usage measure and said first content descriptor, wherein said user progress in said software application is measured by said operating system as directed by said software application;

said operating system accessing a third API call from said software applicaition, said third API call providing a second content descriptor and a provided measure of said user progress; and said operating system storing, in the computer readable medium on said electronic device, said measure of said user progress and said second content descriptor, wherein said provided measure of said user progress in said software application is provided by said software application.

15. The method as described in claim 14, wherein said measure of user progress describes percent usage of content identified by said content descriptor.

16. The method as described in claim 15, wherein said first and second descriptors identify levels of a game.

17. The method as described in claim 15, wherein said first and second descriptors identify segments in an electronic document.

* * * * *